US011303338B2

(12) United States Patent
Kim

(10) Patent No.: US 11,303,338 B2
(45) Date of Patent: Apr. 12, 2022

(54) APPARATUS AND METHOD FOR BEAMFORMING IN WIRELESS COMMUNICATION SYSTEM

(71) Applicant: Samsung Electronics Co., Ltd., Suwon-si (KR)

(72) Inventor: Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/019,888

(22) Filed: Sep. 14, 2020

(65) Prior Publication Data

US 2020/0412427 A1 Dec. 31, 2020

Related U.S. Application Data

(63) Continuation of application No. 15/470,412, filed on Mar. 27, 2017, now Pat. No. 10,778,303, which is a
(Continued)

(30) Foreign Application Priority Data

Jul. 28, 2011 (KR) ........................ 10-2011-0074971
Jul. 26, 2012 (KR) ........................ 10-2012-0081790

(51) Int. Cl.
*H04B 7/06* (2006.01)
*H01Q 3/24* (2006.01)
(Continued)

(52) U.S. Cl.
CPC ............. *H04B 7/0617* (2013.01); *H01Q 3/24* (2013.01); *H04B 7/022* (2013.01); *H04B 7/0684* (2013.01);
(Continued)

(58) Field of Classification Search
CPC .... H04B 7/0617; H04B 7/022; H04B 7/0684; H04B 7/0695; H01Q 3/24; H04L 25/03; H04W 16/28
See application file for complete search history.

(56) References Cited

U.S. PATENT DOCUMENTS 5,859,840 A 1/1999 Tiedemann, Jr. et al.
6,484,031 B1 11/2002 Ruutu et al.
(Continued)

FOREIGN PATENT DOCUMENTS

AU 2008312350 A1 4/2009
CN 101223720 A 7/2008
(Continued)

OTHER PUBLICATIONS

Wireless LAN at 60 GHz—IEEE 802.11ad Explained, Application Note, May 30, 2013, pp. 1-28, 5990-9697EN, Agilent Technologies, USA.
(Continued)

*Primary Examiner* — Ankur Jain
*Assistant Examiner* — Angelica M Perez
(74) *Attorney, Agent, or Firm* — Jefferson IP Law, LLP

(57) ABSTRACT

An apparatus and a method for generating a frame for communication using beamforming in a wireless communication system are provided. A method for transmitting a signal in a transmitting stage includes determining a beam change time of a region for transmitting information in a frame, and transmitting the information to a receiving stage over the region for transmitting the information by considering the beam change time. The frame includes a plurality of regions divided based on a type of the information transmitted to the receiving stage, and the plurality of the regions includes different beam change times.

20 Claims, 16 Drawing Sheets

Related U.S. Application Data continuation of application No. 13/560,188, filed on Jul. 27, 2012, now Pat. No. 9,985,705.

(51) Int. Cl.
  *H04B 7/022* (2017.01)
  *H04L 25/03* (2006.01)
  *H04W 16/28* (2009.01)

(52) U.S. Cl.
  CPC ........... *H04B 7/0695* (2013.01); *H04L 25/03* (2013.01); *H04W 16/28* (2013.01)

(56) References Cited

U.S. PATENT DOCUMENTS

| | | |
|---|---|---|
| 8,817,603 B2 | 8/2014 | Houtman et al. |
| 10,264,536 B2 | 4/2019 | Nogami et al. |
| 2004/0214606 A1 | 10/2004 | Wichman et al. |
| 2006/0034279 A1 | 2/2006 | Cho et al. |
| 2007/0142074 A1 | 6/2007 | Black et al. |
| 2008/0144738 A1 | 6/2008 | Naguib |
| 2009/0028128 A1 | 1/2009 | Trott et al. |
| 2009/0116565 A1 | 5/2009 | Ahn et al. |
| 2009/0160707 A1 | 6/2009 | Lakkis |
| 2009/0279512 A1 | 11/2009 | Fujishima et al. |
| 2009/0279523 A1 | 11/2009 | Doi et al. |
| 2009/0298424 A1 | 12/2009 | Liu et al. |
| 2010/0016023 A1* | 1/2010 | Yamauchi ............ H04B 7/0695 455/562.1 |
| 2010/0120442 A1 | 5/2010 | Zhuang et al. |
| 2010/0150254 A1 | 6/2010 | Hansen et al. |
| 2010/0182903 A1 | 7/2010 | Palanki et al. |
| 2010/0265924 A1 | 10/2010 | Yong et al. |
| 2010/0279628 A1 | 11/2010 | Love et al. |
| 2010/0322066 A1 | 12/2010 | Chun et al. |
| 2011/0013615 A1 | 1/2011 | Lee et al. |
| 2011/0044188 A1 | 2/2011 | Luo et al. |
| 2011/0096783 A1 | 4/2011 | Cai et al. |
| 2011/0280201 A1 | 11/2011 | Luo et al. |
| 2012/0076039 A1 | 3/2012 | Kwon et al. |
| 2012/0163198 A1 | 6/2012 | Chin et al. |
| 2012/0207126 A1 | 8/2012 | Qu et al. |
| 2012/0230320 A1 | 9/2012 | Kishiyama et al. |
| 2013/0051302 A1 | 2/2013 | Kim |
| 2013/0250863 A1 | 9/2013 | Nogami et al. |
| 2019/0296874 A1 | 9/2019 | Chung et al. |

FOREIGN PATENT DOCUMENTS

| | | |
|---|---|---|
| CN | 101243699 A | 8/2008 |
| CN | 101517930 A | 8/2009 |
| CN | 101904125 A | 12/2010 |
| CN | 102104403 A | 6/2011 |
| JP | 2007-89113 A | 4/2007 |
| JP | 2011-502386 A | 1/2011 |
| KR | 10-2008-0026010 A | 3/2008 |
| KR | 10-0847015 B1 | 7/2008 |
| KR | 10-2009-0091239 A | 8/2009 |
| KR | 10-1820733 B1 | 1/2018 |
| WO | 2007/066074 A1 | 6/2007 |
| WO | 2008/029686 A2 | 3/2008 |
| WO | 2009049167 * | 4/2009 |
| WO | 2010/073468 A1 | 7/2010 |
| WO | 2010073468 * | 7/2010 |
| WO | 20100137917 A2 | 12/2010 |

OTHER PUBLICATIONS

U.S. Appl. No. 13/560,188; Notice of Allowance dated Jan. 22, 2018.
Korean Office Action with English translation dated Sep. 3, 2018; Korean Appln. No. 10-2012-0081790.
Korean Notice of Patent Grant dated Feb. 1, 2019, issued in a counterpart Korean application No. 10-2012-0081790.
Indian Office Action dated Apr. 22, 2019, issued in Indian Patent Application No. 121/KOLNP/2014.
European Office Action dated May 15, 2019, issued in European Patent Application No. 12817043.8-1220.
Summons to attend oral proceedings, dated Feb. 17, 2021, issued in European Application No. 12817043.8.
European Decision to Refuse dated Jan. 4, 2022, issued in European Patent Application No. 12817043.8-1216.
Indian Office Action dated Feb. 1, 2022, issued in Indian Patent Application No. 202138009508.

* cited by examiner

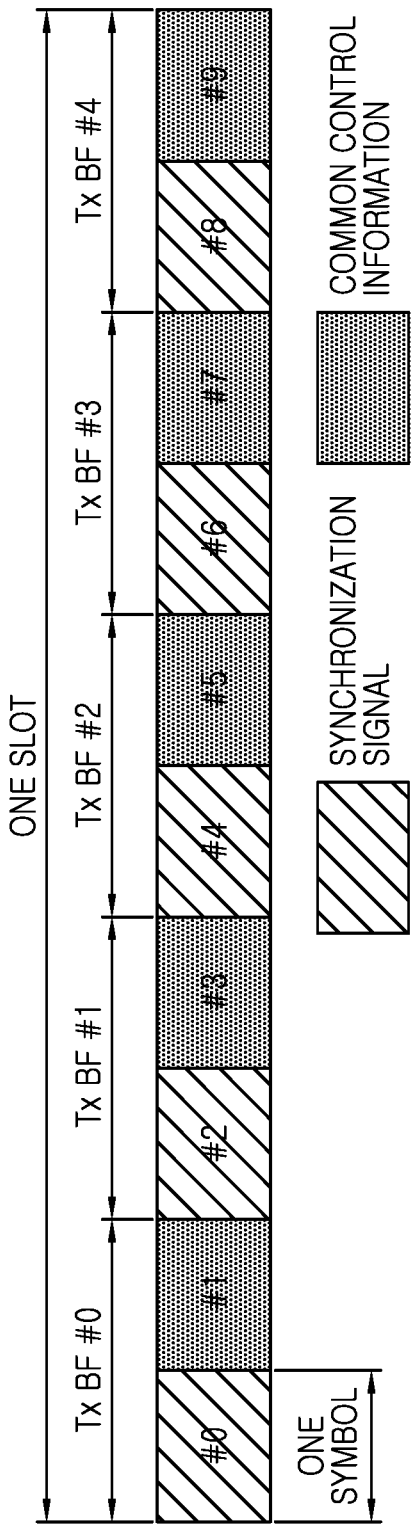
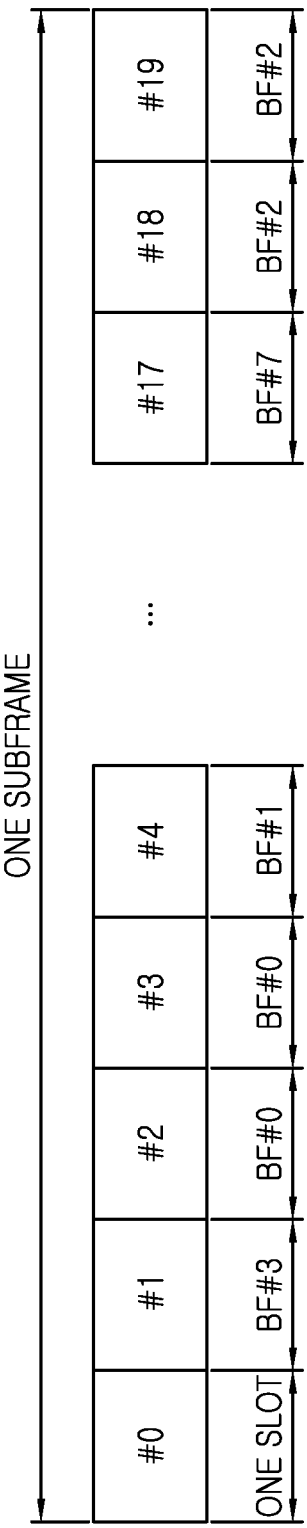
FIG.2A
FIG.2B

APPARATUS AND METHOD FOR BEAMFORMING IN WIRELESS COMMUNICATION SYSTEM

CROSS-REFERENCE TO RELATED APPLICATION(S)

This application is a continuation application of prior application Ser. No. 15/470,412, filed on Mar. 27, 2017, which is a continuation application of prior application Ser. No. 13/560,188, filed on Jul. 27, 2012, which has issued as U.S. Pat. No. 9,985,705 on May 29, 2018 and is based on and claims priority under 35 U.S.C § 119(a) of a Korean patent application number 10-2011-0074971, filed on Jul. 28, 2011, in the Korean Intellectual Property Office, and a Korean patent application number 10-2012-0081790, filed on Jul. 26, 2012, in the Korean Intellectual Property Office, the disclosure of each of which is incorporated by reference herein in its entirety.

BACKGROUND OF THE INVENTION

1. Field of the Invention

The present invention relates to an apparatus and a method for beamforming in a wireless communication system. More particularly, the present invention relates to an apparatus and a method for generating a frame for communication using beamforming in a wireless communication system.

2. Description of the Related Art

A wireless communication system can enhance a data transfer rate using a beamforming technique. Beamforming is a series of techniques for enhancing transmission and reception performance using a high-gain antenna.

Using beamforming, the wireless communication system needs to reduce an antenna beam width in order to raise the antenna gain. The wireless communication system needs to use a plurality of narrow beams to transmit signals in all directions.

However, since a frame is not defined for the communication using beamforming in the wireless communication system, it is required to generate the frame for the communication by use of beamforming.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide an apparatus and a method for generating a frame for communication using beamforming in a wireless communication system.

Another aspect of the present invention is to provide an apparatus and a method for generating a frame for communication using beamforming in a wireless communication system which utilizes a plurality of beamforming antennas.

Yet another aspect of the present invention is to provide an apparatus and a method for generating a frame to differently set a beam change time according to a type of information transmitted using beamforming in a wireless communication system.

Still another aspect of the present invention is to provide an apparatus and a method for generating a frame to adaptively define a pilot pattern according to a type of information transmitted using beamforming in a wireless communication system.

A further aspect of the present invention is to provide an apparatus and a method for determining the number of symbols constituting a slot by considering a Cyclic Prefix (CP) length in a wireless communication system.

A further aspect of the present invention is to provide an apparatus and a method for generating a frame such that a symbol at the point of the beam change uses a long CP in a wireless communication system.

In accordance with an aspect of the present invention, a method for transmitting a signal in a transmitting stage of a wireless communication system which comprises a plurality of antennas and forms a plurality of beams is provided. The method includes determining a beam change time of a region for transmitting information in a frame, and transmitting the information to a receiving stage over the region for transmitting the information by considering the beam change time, wherein the frame comprises a plurality of regions divided based on a type of the information transmitted to the receiving stage, and wherein the plurality of the regions comprises different beam change times.

According to another aspect of the present invention, an apparatus for transmitting a signal in a transmitting stage of a wireless communication system which forms a plurality of beams is provided. The apparatus includes an antenna unit for comprising a plurality of antenna elements, a Radio Frequency (RF) chain for forming a beam through the antenna unit, and a controller for transmitting information to a receiving stage over a region for transmitting the information by considering a beam change time of the region for transmitting the information in a frame, wherein the frame comprises a plurality of regions divided based on a type of the information transmitted to the receiving stage, and wherein the plurality of the regions comprises different beam change times.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 2A through 2D illustrate a frame of a wireless communication system according to exemplary embodiments of the present invention;

Throughout the drawings, it should be noted that like reference numerals will be understood to refer to like parts, components and structures.

DETAILED DESCRIPTION OF EXEMPLARY EMBODIMENTS

Figure 1:
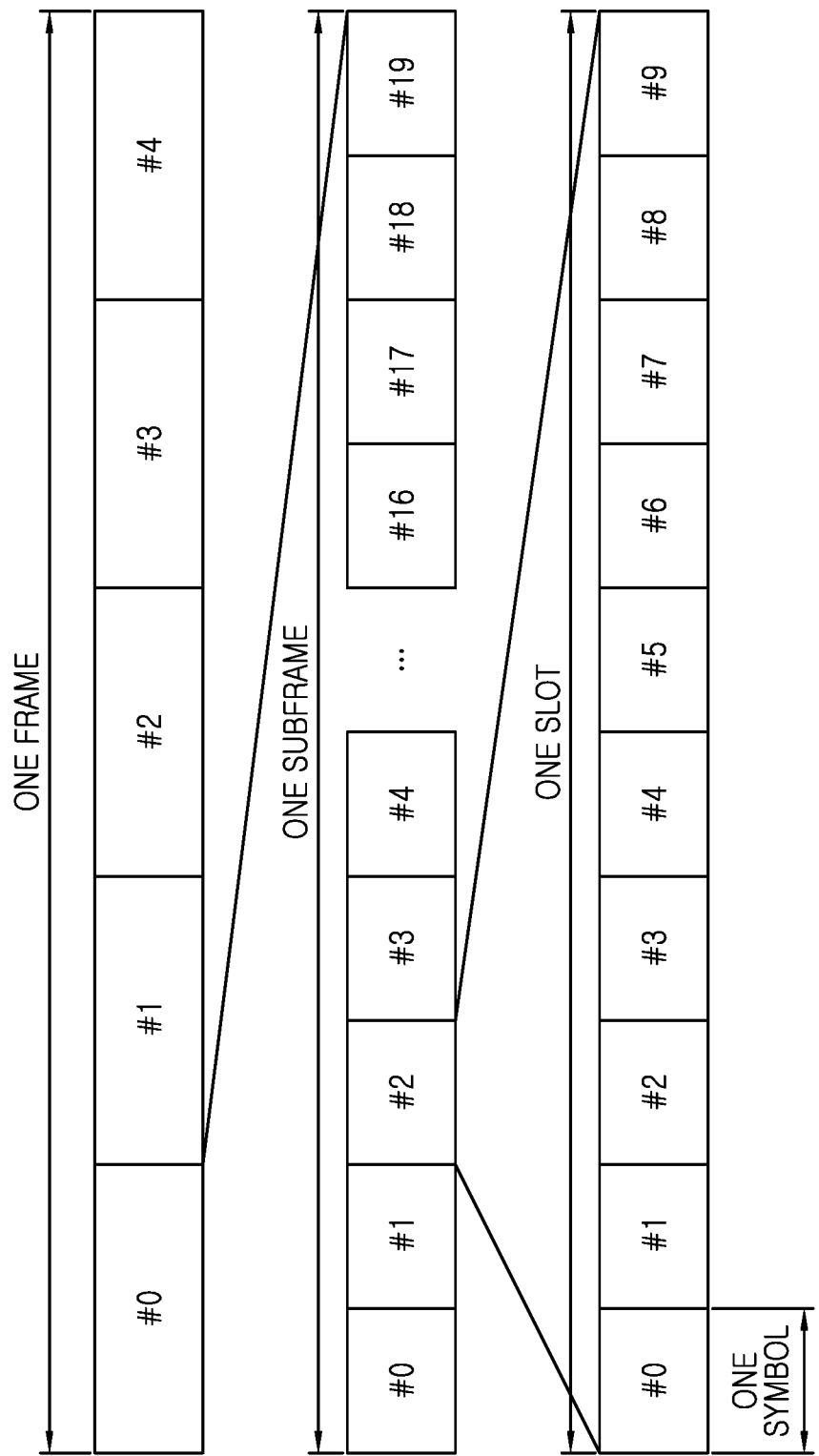
FIG. 1 illustrates a frame of a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An exemplary embodiment of the present invention provides a technique for generating a frame for communication using beamforming in a wireless communication system.

Hereinafter, it is assumed that a wireless communication system adopts an antenna beamforming technique. The antenna beamforming technique forms the beam by changing a phase of a radio frequency signal transmitted and received over each antenna.

FIGS. 1 through 14, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a frame of a wireless communication system according to an exemplary embodiment of the present invention.

Referring to FIG. 1, the frame includes a plurality of fixed-length subframes, and one subframe includes a plurality of fixed-length slots. One slot includes a plurality of fixed-length symbols. For example, the frame can include 5 subframes, one subframe can include 20 slots, and one slot can include 10 or 11 symbols. In so doing, the number of the symbols constituting the slot is determined by a length of a Cyclic Prefix (CP) of each symbol. For example, when one slot of 50 us includes 10 symbols, the length of each symbol is equally 5 us and the CP length of each symbol is equally 1us. For example, when one slot of 50 us includes 11 symbols, the length of the first symbol of the slot is 5 us and the remaining 10 symbols are 4.5 us in length. At this time, the CP length of the first symbol of the slot is 1us and the CP length of the remaining 10 symbols is 0.5 us.

The wireless communication system divides the frame into a first slot for at least one of a synchronization signal and common control information, a training signal slot, a control slot, and a data slot. The slots can be constructed as shown in FIGS. 2A to 2D according to properties of information transmitted by the corresponding slot. Herein, the first slot can include any one of a slot for the synchronization signal and the common control information, a slot for the synchronization signal, and a slot for the common control information. Hereafter, it is assumed that the first slot is the slot for the synchronization signal and the common control information.

FIGS. 2A through 2D illustrate a frame of a wireless communication system according to exemplary embodiments of the present invention.

Figure 2C:
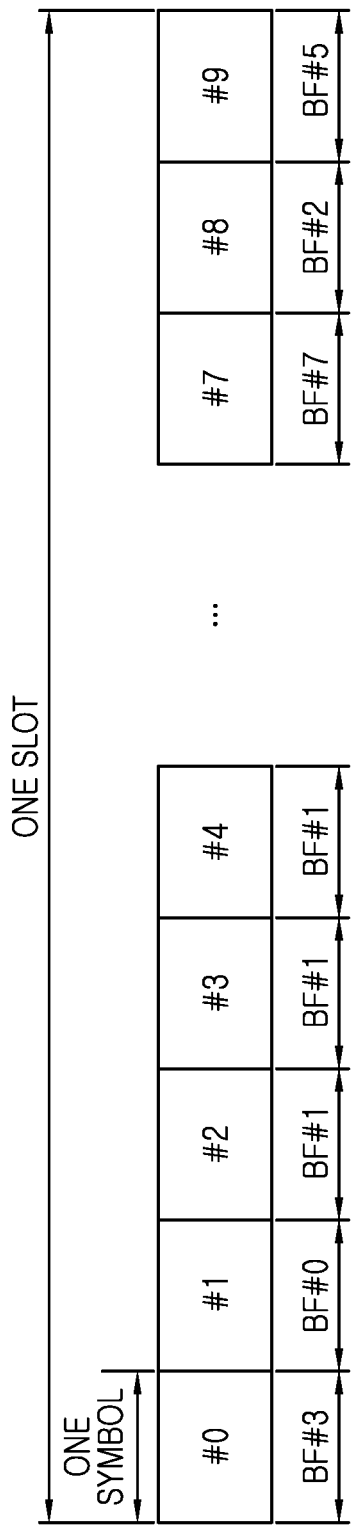
Figure 2D:
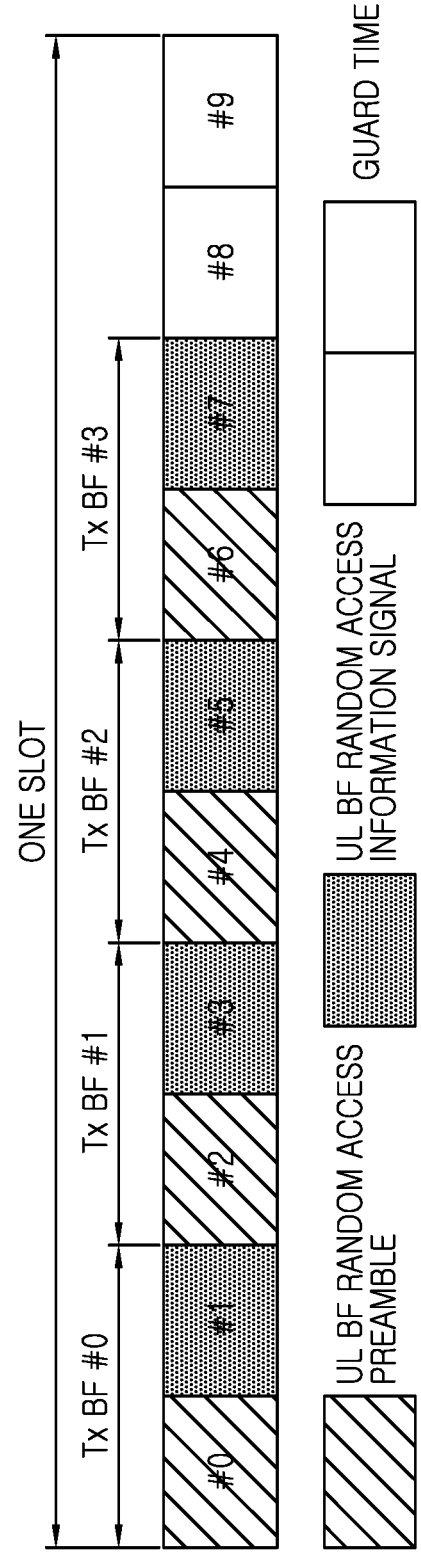

FIG. 2A illustrates a slot for the synchronization signal and the common control information, FIG. 2B illustrates a subframe for data and control information, FIG. 2C illustrates a control slot, and FIG. 2D illustrates a random access channel slot.

Referring to FIG. 2A, the slot for the synchronization signal and the common control information is a minimum unit for carrying the synchronization signal and the common control information in the frame and is located in a designated region of the frame. A transmitting stage repeatedly transmits the synchronization signal and the common control information while changing the beam per antenna beam within the slot for the synchronization signal and the common control information so that a receiving stage can receive the synchronization signal and the common control information at any location in the cell. For example, when the slot #2 of the subframe #0 of FIG. 1 is the slot for the synchronization signal and the common control information, the transmitting stage transmits the synchronization signal and the common control information over the slot #2 of the subframe #0 of each frame. In so doing, the transmitting stage transmits the synchronization signal and the common control information with the transmit beam #0 using the symbols #0 and #1, transmits the synchronization signal and the common control information with the transmit beam #1 using the symbols #2 and #3, and transmits the synchronization signal and the common control information with the transmit beam #2 using the symbols #4 and #5. Herein, the common control information includes control information transmitted on the frame basis, such as cell identifier, system, and cell common system information for the cell access and migration of the receiving stage, and frame configuration information. For example, according to the 3rd Generation Partnership Project (3GPP) standard, the common control information includes part or all of a Master Information Block (MIB), a System Information Block (SIB) 1, and an SIB 2. That is, the common control information includes the number of antenna layers, a downlink bandwidth, a base station and cell identifiers, a Public Land Mobile Network (PLMN) identifier, an uplink frequency, an uplink bandwidth, a duplex type, random access resource allocation information, and a frame number.

The transmitting stage transmits the synchronization signal and the common control information, either of which including the beam identifier, so that the receiving stage can identify the beam for receiving the synchronization signal and the common control information. For example, when the synchronization signal carries the beam identifier, the transmitting stage does not have to successively transmit the synchronization signal and the common control information. That is, the transmitting stage can transmit the common control information over the other fixed slot which does not adjoin the synchronization signal. For example, when the common control information carries the beam identifier, the transmitting stage needs to consecutively transmit the synchronization signal and the common control information.

As stated above, while the transmission location of the synchronization signal is fixed in the frame, the number of the slots for the synchronization signal and the common control information can vary. For example, the number of the slots for the synchronization signal and the common control information can differ according to the number of the transmit beams of the transmitting stage.

Referring to FIG. 2B, at least one slot is allocated to the control slot, in one subframe, for carrying the control information and other slots are allocated to the data slots for carrying data. Herein, the number of the control slots and the data slots in the subframe can differ per subframe.

All of the symbols in one data slot use the same beam. When the data slot is changed, the beam for transmitting the data can alter. For example, the transmitting stage transmits data over the slot #1 using the beam #3 and the slots #2 and #3 using the beam #0. That is, the minimum unit for carrying user data with the same beam is defined as the slot. Accordingly, one slot can be set to one Transmission Time Interval (TTI) so that the receiving stage, receiving merely one slot, can decode the data.

When the slot #0 is allocated to the control slot in the subframe of FIG. 2B, the control slot (the slot #0) is constituted as shown in FIG. 2C.

Referring to FIG. 2C, the control slot can change the beam carrying the control information based on at least one symbol. For example, the transmitting stage transmits the control information over the symbol #0 using the beam #3, the symbol #1 using the beam #0, and the symbol #9 using the beam #5. Herein, the control information includes the resource allocation information for the data transmission.

Referring to FIG. 2D, every resource in one slot can be allocated to the random access channel slot. At this time, the resource allocation information of the random access channel slot is carried by the common control information to the receiving stage.

Using the random access channel slot, the receiving stage transmits a random access preamble and a random access information signal. When the receiving stage knows an optimum transmit beam of the transmitting stage, the receiving stage transmits the random access preamble and the random access information signal just once using the optimum transmit beam. By contrast, when not knowing the optimum transmit beam of the transmitting stage, the receiving stage repeatedly transmits the random access preamble and the random access information signal while changing the transmit beam direction. Herein, the random access preamble indicates a signal for detecting synchronization of the uplink signal. The random access information signal includes receiving stage information including the transmit beam identifier of the receiving stage.

The transmitting stage receives the random access signal using one beam within one slot. When the slot is changed, the transmitting stage receives the random access signal by changing the beam. Herein, the random access signal includes the random access preamble and the random access information signal.

In this exemplary embodiment, the random access channel slot uses the resources of one slot. Alternatively, the random access channel slot may use part of the resources of the data slot.

In the frame of the wireless communication system, the beam change time differs according to the channel type. The frame can be constructed such that the symbol of the long CP can be positioned at the point of the beam change. For example, as the control slot of FIG. 2C can change the beam based on at least one symbol, the long CP (lus) is used per symbol. Accordingly, the control slot can include 10 symbols based on the long CP Similarly to the control slot, the slot for the synchronization signal and the control signal and the training signal slot, which can change the beam based on at least one symbol, can apply the long CP per symbol. For example, the data slot of FIG. 2B, which can change the beam based on the slot, utilizes the long CP (lus) in its first symbol. In so doing, the other symbols of the data slot excluding the first symbol can apply the short CP (0.5 us) to increase the transmission efficiency or the long CP (lus) in the light of the channel properties. When the other symbols of the data slot excluding the first symbol use the short CP, the data slot can include 11 symbols. By contrast, when the other symbols of the data slot excluding the first symbol use the long CP, the data slot can include 10 symbols.

As such, each symbol can include the CP of the different lengths. However, the frame includes the slots of the same length. Hence, the frame can be constituted such that the slots including the symbols of the different CP lengths can coexist. In this case, the frame can selectively use the CP of the optimum length based on the channel properties and the beam change time.

As described so far, the data slot and the control slot have different units for the beam change. Thus, the transmitting stage can transmit a reference signal, such as pilot as shown in FIGS. 3A and 3B.

Figure 3A:
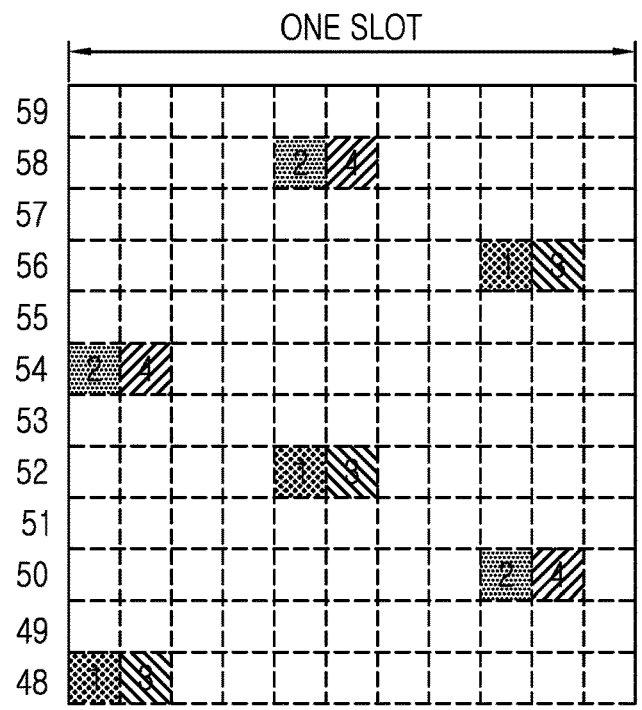
FIGS. 3A and 3B illustrate reference signals of a wireless communication system according to exemplary embodiments of the present invention.
Figure 3A:
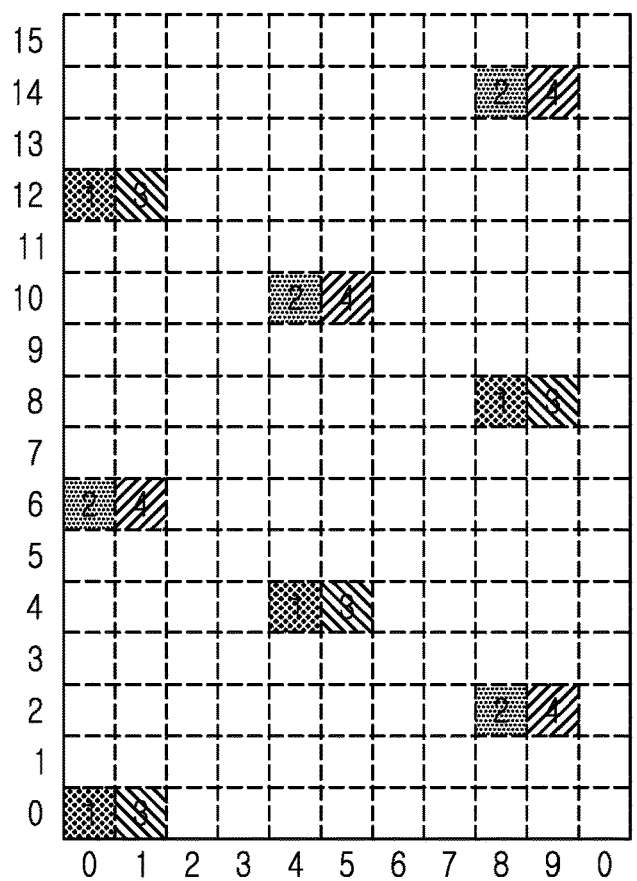
Figure 3B:
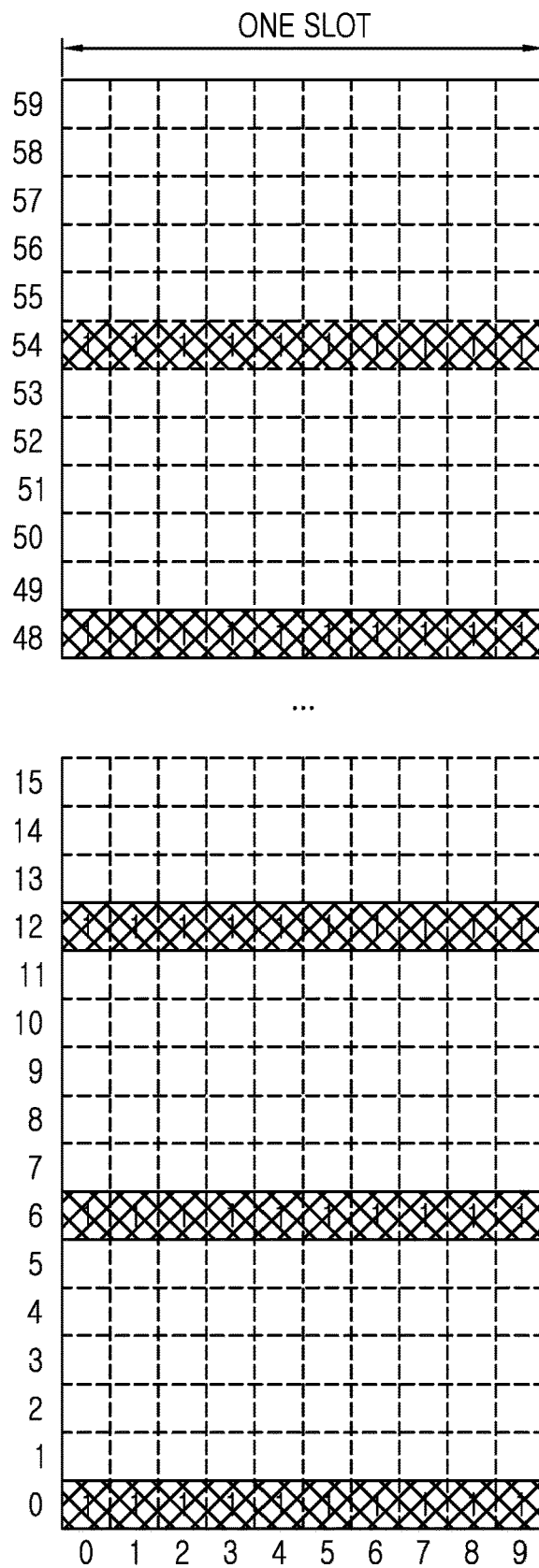

FIGS. 3A and 3B illustrate reference signals of a wireless communication system according to exemplary embodiments of the present invention.

FIG. 3A illustrates a reference signal of a data slot, and FIG. 3B illustrates a reference signal of a control slot. The data slot is assumed to include 11 symbols.

Referring to FIG. 3A, the data slot, which changes the beam based on the slot, generates the reference signal based on the slot. For example, the data slot can carry four independent Quadrature Amplitude Modulation (QAM) or Phase Shift Keying (PSK) symbols together in the subcarrier of each symbol.

Referring to FIG. 3B, the control slot, which changes the beam based on at least one symbol, generates the reference signal based on at least one symbol.

Figure 4:
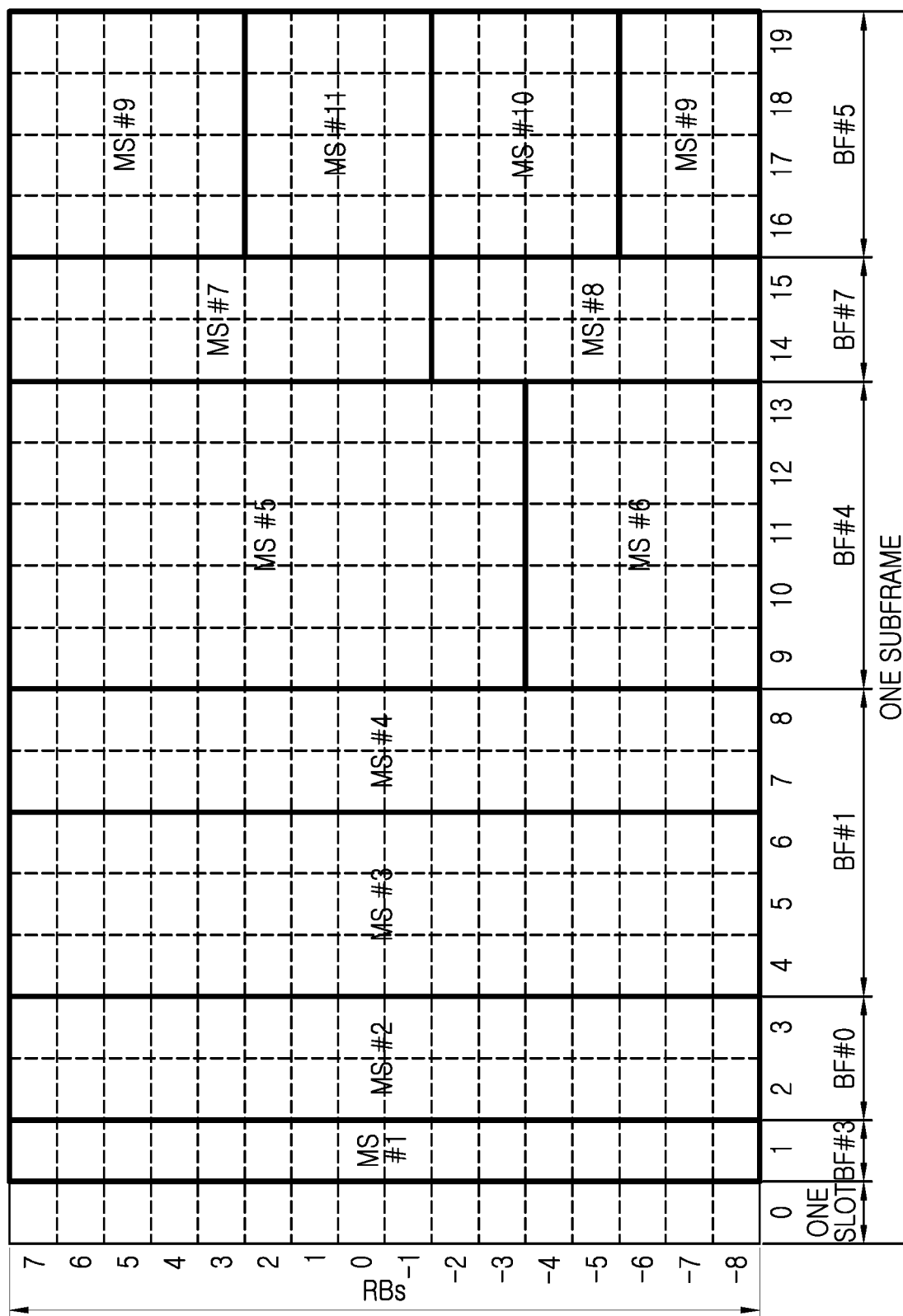
FIG. 4 illustrates resource allocation in a wireless communication system according to an exemplary embodiment of the present invention.

With the frame as constructed above, the resources can be allocated as shown in FIG. 4.

FIG. 4 illustrates resource allocation in a wireless communication system according to an exemplary embodiment of the present invention.

Referring to FIG. 4, a transmitting stage can allocate the resources of the data slots #4, #5 and #6 to the receiving stage #3 using the beam #1 and allocate the resources of the data slots #7 and #8 to the receiving stage #4 using the beam #1.

In addition, the transmitting stage can allocate the resources of the slots #9 through #13 to the receiving stages #5 and #6 using the beam #4. The resources of the slots #9 through #13 allocated to the receiving stages #5 and #6 are distinguished as different frequency resources.

Figure 5:
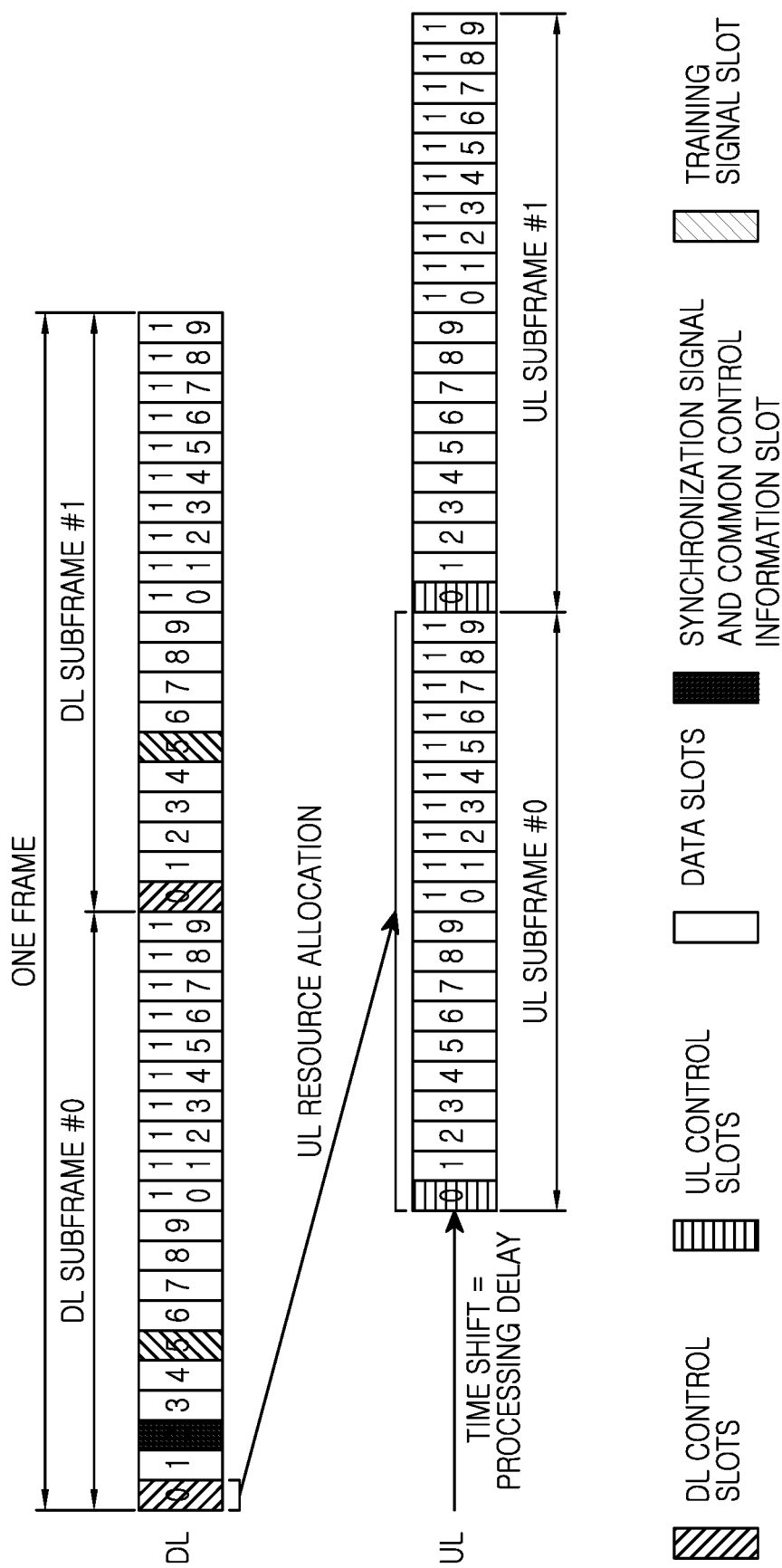
FIG. 5 illustrates a frame of a wireless communication system adopting Frequency Division Duplexing (FDD) according to an exemplary embodiment of the present invention.

When a Frequency Division Duplexing (FDD) frame is generated using the frame structure as above, the wireless communication can generate an FDD frame as shown in FIG. 5.

FIG. 5 illustrates a frame of a wireless communication system adopting FDD according to an exemplary embodiment of the present invention.

Referring to FIG. 5, according to FDD, the downlink and the uplink occupy different frequency resources. Hence, the FDD frame is generated such that a downlink frame and an uplink frame occupy different frequencies.

The downlink frame and the uplink frame each include 5 subframes, and one subframe includes 20 slots. One slot includes 10 or 11 symbols.

The downlink frame allocates the slot #0 of each subframe to the control slot and allocates the slot #2 of the subframe #0 to the synchronization signal and common control information slot.

The downlink frame allocates the slot #5 of each subframe to the training signal slot and allocates the other slots to the data slots.

The uplink frame allocates the slot #0 of each subframe to the control slot and allocates the other slots to the data slots. Herein, the control information transmitted by the receiving stage over the uplink control slot includes Hybrid Automatic Repeat reQuest (HARQ) ACKnowledgment/Non-ACKnowledgment (ACK/NACK) information, Channel Quality Indicator (CQI) feedback information, Precoding Matrix Indicator (PMI) information, rank indicator information, scheduling request information, transmit beam information of the base station, and training signal request information.

Figure 6:
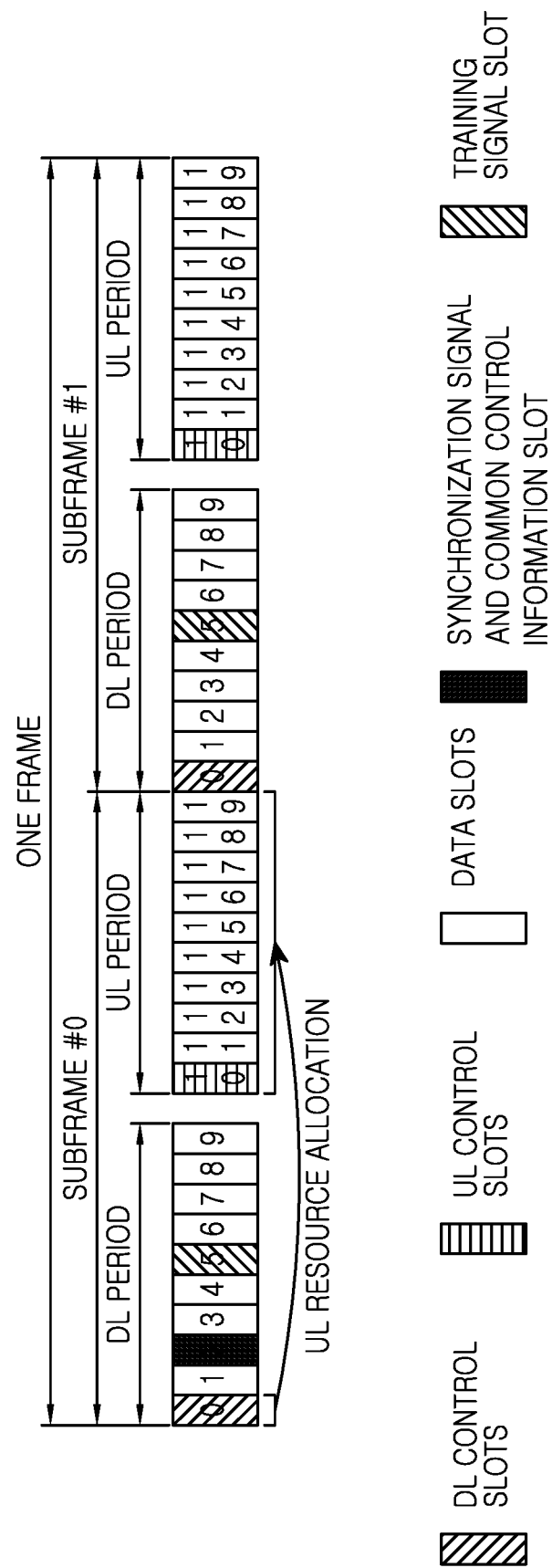
FIG. 6 illustrates a frame of a wireless communication system adopting Time Division Duplexing (TDD) according to an exemplary embodiment of the present invention.

The wireless communication system can generate a Time Division Duplexing (TDD) frame as shown in FIG. 6.

FIG. 6 illustrates a frame of a wireless communication system adopting TDD according to an exemplary embodiment of the present invention.

Referring to FIG. 6, according to TDD, the downlink and the uplink occupy different time resources. Hence, the TDD frame divides a downlink frame and an uplink frame with time resources.

The TDD frame includes 5 subframes, and one subframe includes 20 slots. One slot includes 10 or 11 symbols.

In one subframe, the slots #0 through #10 are allocated to the downlink frame and the slots #11 through #19 are allocated to the uplink frame.

The downlink frame allocates the slot #0 of each subframe to the downlink control slot and allocates the slot #2 of the subframe #0 to the synchronization signal and common control information slot.

The downlink frame allocates the slot #5 of each subframe to the training signal slot and allocates the other slots to the data slots.

The uplink frame allocates the slot #11 of each subframe to the uplink control slot and allocates the other slots to the data slots.

The slot #10 of each subframe is used as the CP for the operation switch. The CP for the operation switch, which is not shown in the drawing, is interposed between the subframes.

As such, the training signal slot is allocated to select the narrow beam which is used to transmit and receive the data. Within the training signal slot, the transmitting stage can change the beam direction based on at least one symbol. Herein, the training signal slot is periodically allocated to the fixed position as shown in FIGS. 5 and 6, or may be aperiodically allocated according to the request of the receiving stage.

The synchronization signal carries the beam identifier using part of the synchronization signal code or using the common control information. Rather than directly carrying the beam identifier, the training signal can indirectly notify the beam identifier using the location and the order of the training signal in the training signal slot.

The training signals in the training signal slot should be selected to minimize inter-cell interference. For example, the training signals are arranged at regular subcarrier intervals like the reference signal of FIG. 3B, and the location of the training signal varies in each cell. For example, the training signal sequence may be generated orthogonally according to the cell identifier so as to mitigate the interference.

The wireless communication system can provide a communication service using a plurality of different bandwidths. Hence, the frame of the wireless communication system needs to be designed to support the multiple bandwidths.

To support the bandwidths, the frame is to be designed such that the synchronization signal and the common control information are transmitted using the minimum bandwidth and the other signals occupy the whole frequency band. For example, when supporting the bandwidth 1 GHz with 16 Resource Blocks (RBs), the wireless communication system can support four bandwidths of 125 MHz, 250 MHz, 500 MHz, and 1 GHz. Thus, the frame allocates the synchronization signal and the common control information to two central RBs corresponding to the minimum bandwidth 125 MHz and allocates the other signals to the whole band of 1 GHz.

As such, the control slot for the control information is separately provided. When the amount of the control information transmitted by the transmitting stage matches the multiple of the resource amount of the slot, unnecessary resource waste of the control slot does not occur. However, when the amount of the control information transmitted by the transmitting stage does not match the multiple of the resource amount of the slot, the control slot causes the unnecessary resource waste. For example, when one slot includes 10 symbols and the transmitting stage requires 12 symbols to transmit the control information, the frame allocates two slots to the control slots. In this case, eight symbols of the second control slot can be unnecessarily wasted.

To reduce the resource waste of the control slot, when the amount of the control information transmitted by the transmitting stage does not match the multiple of the resource amount of the slot, the transmitting stage can transmit the control information by puncturing part of the data slot. When the reference signal of the data slot is punctured to transmit the control information, the channel estimation performance of the receiving stage can be degraded. Hence, the transmitting stage can alleviate the performance degradation caused by the puncturing by evenly distributing the reference signal over the slot as shown in FIG. 3A.

In this exemplary embodiment, the transmitting stage punctures the data slot for the control information. Similarly, the transmitting stage may transmit the synchronization signal and the common control information or the training signal by puncturing the data slot.

Figure 7:
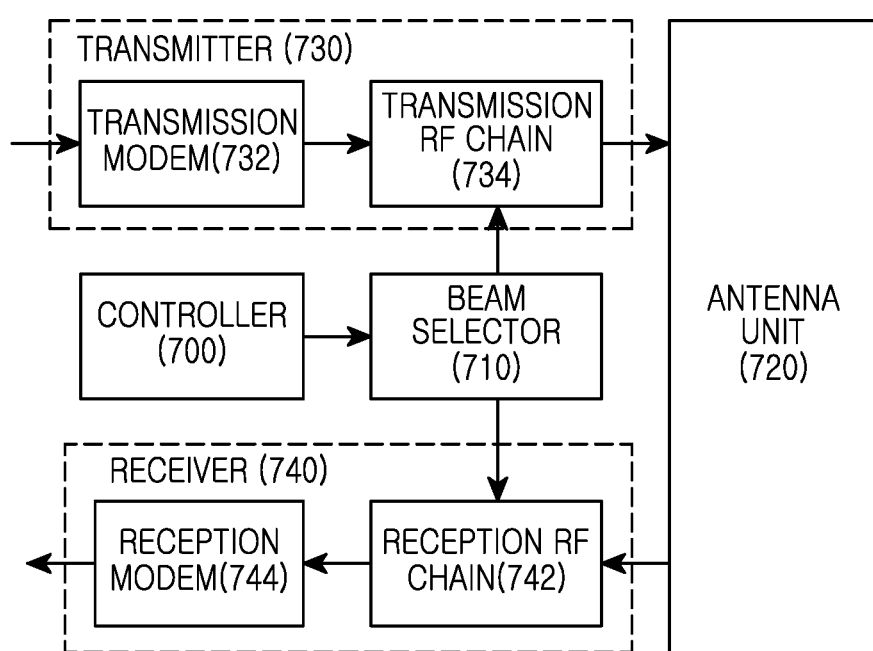
FIG. 7 illustrates a block diagram of a transceiver according to an exemplary embodiment of the present invention.

FIG. 7 illustrates a block diagram of a transceiver according to an exemplary embodiment of the present invention.

Referring to FIG. 7, the transceiver includes a controller 700, a beam selector 710, an antenna unit 720, a transmitter 730, and a receiver 740.

The controller 700 controls the operations of the transceiver.

According to any one of the frame structures of FIGS. 1, 5, and 6, the controller 700 forms the beam to transmit the synchronization signal and the common control information, the control information, the training signal, and the data. For example, the controller 700 transmits the synchronization signal and the common control information over the synchronization signal and common control information slot positioned in the designated region of the frame. In so doing, the controller 700 repeatedly transmits the synchronization signal and the common control information while changing the beam per antenna beam within the synchronization signal and common control information slot as shown in FIG. 2A. The controller 700 transmits the synchronization signal and the common control information, either including the beam identifier, so that the receiving stage can identify the beam receiving the synchronization signal and the common control information.

For example, the controller 700 changes the beam based on the slot in the region allocated to the data slot in the subframe as shown in FIG. 2B. In so doing, the controller 700 transmits the reference signal based on the slot in the data slot as shown in FIG. 3A.

For example, the controller 700 changes the beam based on at least one symbol in the region allocated to the control slot of the subframe as shown in FIG. 2C. In so doing, the controller 700 transmits the reference signal based on at least one symbol in the control slot as shown in FIG. 3B.

For example, when receiving the random access signal over the random access channel slot allocated as shown in FIG. 2D, the controller 700 receives the random access signal using one beam within one slot. When transmitting the random access signal over the random access channel slot, the controller 700 transmits the random access signal once using the optimum transmit beam to carry the random access signal. When not knowing the optimum transmit beam, the controller 700 repeatedly transmits the random access signal by changing the transmit beam direction.

For example, the controller 700 transmits the training signal over the training signal slot of the fixed location. The training signal slot may be aperiodically allocated. The controller 700 may change the beam based on at least one symbol within the training signal slot.

For example, the controller 700 may transmit at least one of the control information, the synchronization signal and the common control information, and the training signal by puncturing part of the data slot. In so doing, the controller 700 transmits the puncturing information of the data slot to the receiving stage using the control information.

The beam selector 710 selects the beam of the corresponding pattern under the control of the controller 700. In the transmit beamforming, the beam selector 710 sends the selected beam pattern information to the transmitter 730. In the receive beamforming, the beam selector 710 sends the selected beam pattern information to the receiver 740.

Figure 8B:
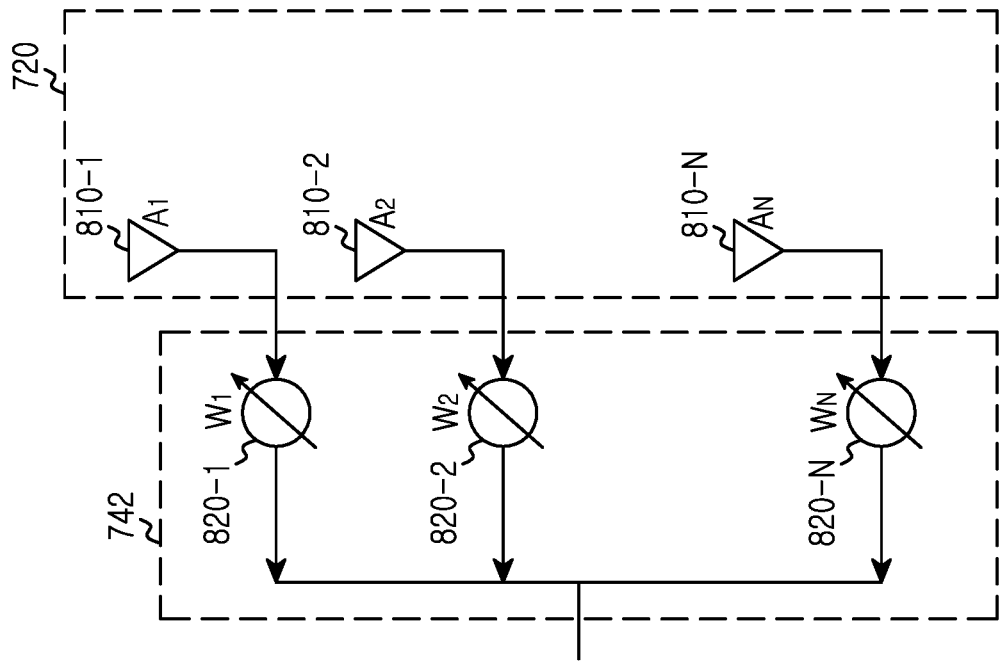
FIGS. 8A and 8B illustrate a Radio Frequency (RF) chain according to exemplary embodiments of the present invention.
Figure 8A:
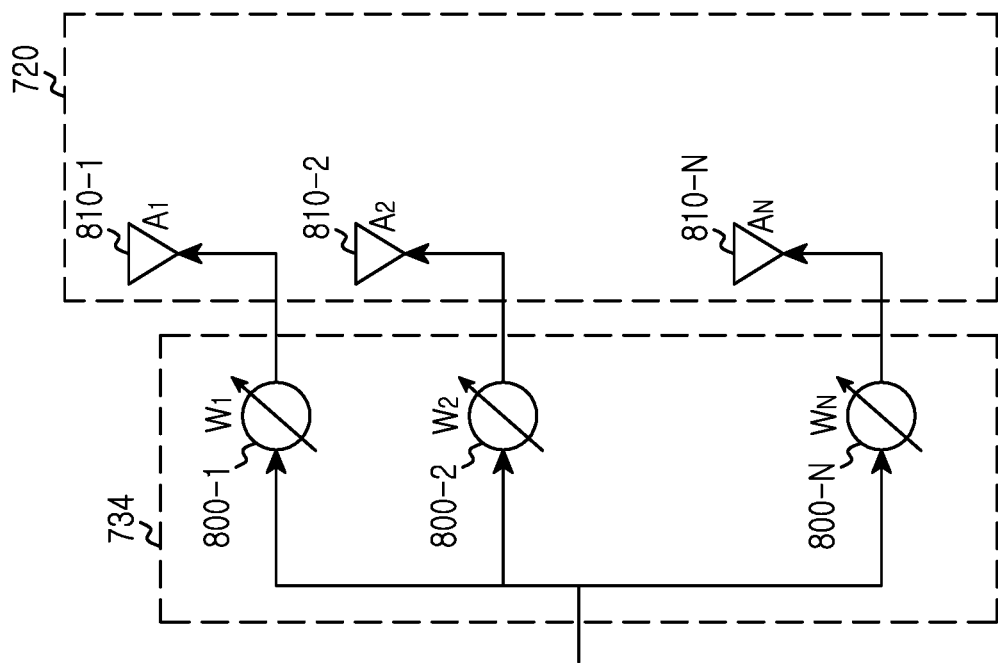
Figure 9:
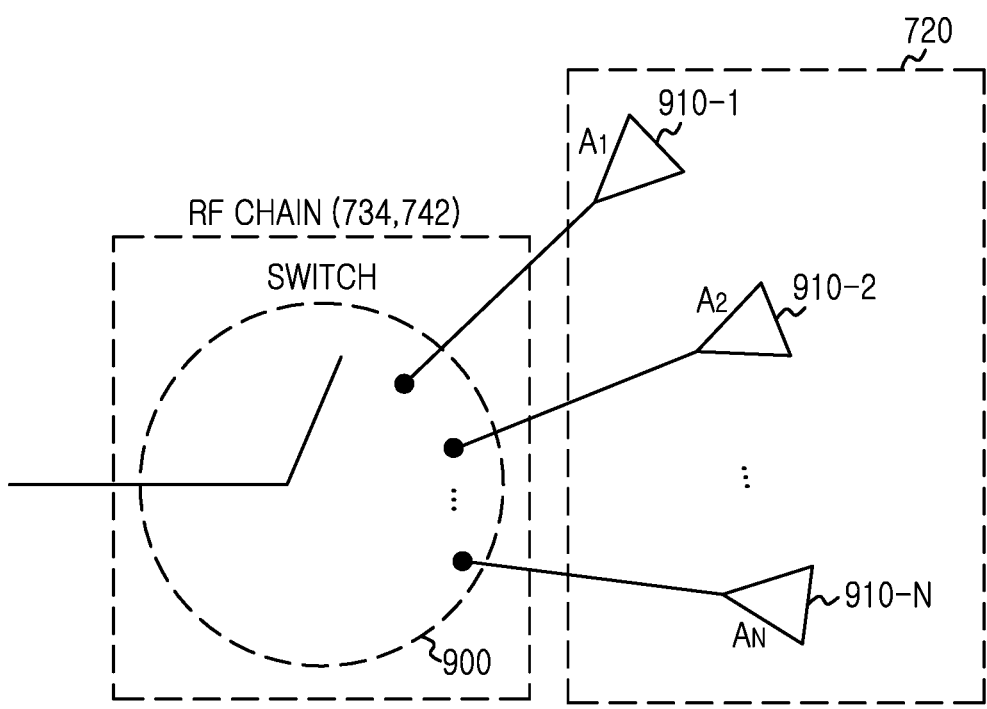
FIG. 9 illustrates an RF chain according to an exemplary embodiment of the present invention.

The antenna unit 720 includes a plurality of antenna elements. For example, the antenna unit 720 includes a plurality of omnidirectional antenna elements as shown in FIGS. 8A and 8B. For example, the antenna unit 720 may include a plurality of directional antenna elements for transmitting the signal in different directions as shown in FIG. 9.

The transmitter 730 includes a transmission modem 732 and a transmission RF chain 734.

The transmission modem 732 encodes and modulates data to transmit to the receiving stage over the antenna, and converts the modulated signal to an analog signal. The transmission modem 732 sends the analog-baseband signal to the transmission RF chain 734.

The transmission RF chain 734 includes a plurality of RF paths for delivering the signals to the antenna elements. In so doing, the transmission RF chain 734 can use only some antenna elements and some RF paths according to the beam pattern and the beam width selected by the beam selector 710.

FIGS. 8A and 8B illustrate a Radio Frequency (RF) chain according to exemplary embodiments of the present invention and FIG. 9 illustrates an RF chain according to an exemplary embodiment of the present invention.

Referring to FIGS. 7, 8A, 8B, and 9, the transmission RF chain 734 multiplexes the baseband signal output from the transmission modem 732 to at least one RF path activated, converts the corresponding baseband signal to an RF signal in each RF path, and transmits the signal through the antenna unit 720. In so doing, the transmission RF chain 734 controls the baseband signal to form the beam in the beam pattern selected by the beam selector 710. For example, when the antenna unit 720 includes the omnidirectional antenna elements as shown in FIG. 8A, the transmission RF chain 734 includes phase shifters 800-1 through 800-N for changing the phase of the signal transmitted in the RF path of each antenna element 810-1 through 810-N. The phase shifters 800-1 through 800-N change the phase of the signal to transmit through each antenna element according to the beam pattern and the beam width selected by the beam selector 710.

For example, when the antenna unit 720 includes the multiple directional antenna elements 910-1 through 910-N as shown in FIG. 9, the transmission RF chain 734 includes a switch 900 which interconnects the transmission modem 732 and the antenna element according to the beam pattern. The switch 900 interconnects at least one antenna element and the transmission modem 732 according to the beam pattern and the beam width selected by the beam selector 710. Herein, the switch 900 can interconnect one transmission modem 732 and at least one antenna element.

The receiver 740 includes a reception RF chain 742 and a reception modem 744.

The reception RF chain 742 includes a plurality of RF paths for the RF signals received via the antenna elements. In so doing, the reception RF chain 742 can use only some antenna elements and some RF paths according to the beam pattern and the beam width selected by the beam selector 710.

The reception RF chain 742 converts the RF signals received from the antenna elements to the baseband signals and sends the baseband signals to the reception modem 744. In so doing, the reception RF chain 742 controls the baseband signal to form the beam in the beam pattern selected by the beam selector 710. For example, when the antenna unit 720 includes the multiple omnidirectional antenna elements as shown in FIG. 8B, the reception RF chain 742 includes phase shifters 820-1 through 820-N for changing the phase of the signals received through the antenna elements 810-1 through 810-N. The phase shifters 820-1 through 820-N change the phase of the signals received through the antenna elements according to the beam pattern and the beam width selected by the beam selector 710.

For example, when the antenna unit 720 includes the directional antenna elements 910-1 through 910-N as shown in FIG. 9, the reception RF chain 742 includes a switch 900 which interconnects the reception modem 744 and the antenna element according to the beam pattern. The switch 900 interconnects at least one antenna element and the reception modem 744 according to the beam pattern and the beam width selected by the beam selector 710. Herein, the switch 900 can interconnect one reception modem 744 and at least one antenna element.

The reception modem 744 converts the analog signal output from the reception RF chain 742, to a digital signal, and demodulates and decodes the digital signal.

In this exemplary embodiment, the transceiver shares the single antenna unit 720. Alternatively, the transmitter and the receiver can employ different antenna units. Alternatively, the transmitter and the receiver may be separate modules.

As stated above, the antenna unit 720 of FIG. 8A or 8B changes the phase of each antenna element or changes the switch according to the structure of FIG. 9. In the process of changing the phase or the switch, the antenna unit 720 is subject to time delay for stabilization because of physical limits of the element. Thus, to mitigate the interference from the beam change of the antenna unit 720, the transmitting stage can use the symbol of the long CP at the point of the beam change.

Figure 10:
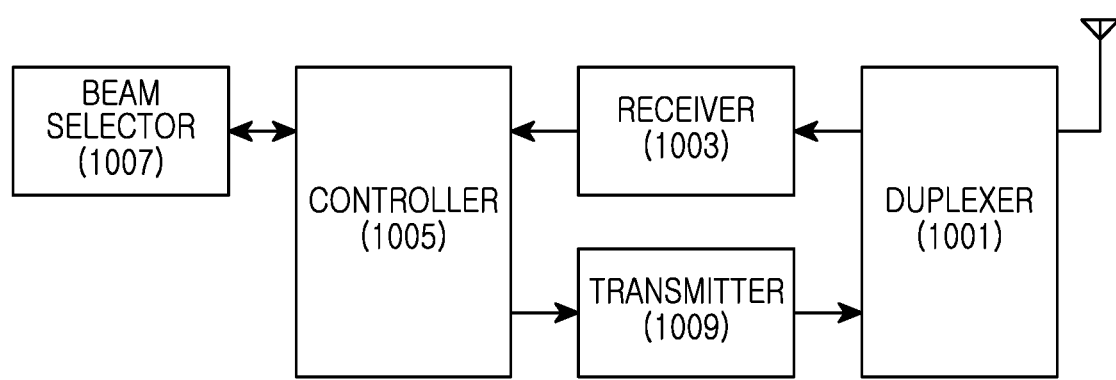
FIG. 10 illustrates a block diagram of a receiving stage according to an exemplary embodiment of the present invention.

FIG. 10 illustrates is a block diagram of a receiving stage according to an exemplary embodiment of the present invention.

Referring to FIG. 10, the receiving stage includes a duplexer 1001, a receiver 1003, a controller 1005, a beam selector 1007, and a transmitter 1009.

The duplexer 1001 transmits the transmit signal output from the transmitter 1009 over the antenna and provides the received signal from the antenna to the receiver 1003 according to the duplexing manner.

The receiver 1003 converts the RF signal fed from the duplexer 1001 to the baseband signal and demodulates the baseband signal. For example, the receiver 1003 can include an RF processing block, a demodulation block, a channel decoding block, and a message processing block. The RF processing block converts the RF signal fed from the duplexer 1001 to the baseband signal. The demodulation block extracts the data from each subcarrier by applying Fast Fourier Transform (FFT) to the signal output from the RF processing block. The channel decoding block includes a demodulator, a deinterleaver, and a channel decoder. The message processing block extracts the control information from the received signal and provides the extracted control information to the controller 1005.

The controller 1005 controls the operations of the receiving stage. For example, the controller 1005 acquires the synchronization with the base station by detecting the transmit beam of the transmitting stage of the maximum receive power using the synchronization signals periodically received from the transmitting stage over the synchronization signal and common control information slot. The controller 1005 initially accesses the transmitting stage by receiving the common control information from the transmitting stage through the detected transmit beam of the transmitting stage.

For example, the controller 1005 controls the beam selector 1007 to select the beam for receiving the data.

For example, the controller 1005 receives the control information and the data through the beam selected by the beam selector 1007. The controller 1005 estimates the channel using the reference signal of the control information and the data. For example, the controller 1005 estimates the channel using the slot-based reference signal of the data as shown in FIG. 3A. For example, the controller 1005 may estimate the channel using the symbol-based reference signal of the control information as shown in FIG. 3B. That is, the controller 1005 estimates the channel using the reference signal received through the beam selected by the beam selector 1007 from the reference signal transmitted by the transmitting stage by changing the beam per symbol in the control slot.

The controller 1005 transmits the control information over the control slot of the uplink frame and to transmit the data over the data slot to the transmitting stage. The control slot of the uplink frame is generated as shown in FIG. 2C, and the data slot is generated as shown in FIG. 2B.

The beam selector 1007 selects the optimum beam to receive the control information and the data using the training signals provided from the transmitting stage over the training signal slot. For example, the beam selector 1007 selects the transmit beam of the transmitting stage for transmitting the control information and the data using the training signals, and the receive beam for receiving the control information and the data from the transmitting stage.

The transmitter 1009 encodes and converts the data and a control message to be sent to the transmitting stage, to an RF signal and outputs the RF signal to the duplexer 1001. For example, the transmitter 1009 can include a message generation block, a channel encoding block, a modulation block, and an RF processing block.

The message generation block generates the control message including information of the narrow beam selected by the beam selector 1007. For example, the message generation block generates the control message including the beam information selected by the beam selector 1007. In another example, the message generation block generates at least one control message of the control information, a sounding signal, and the training signal request information to send over the uplink control slot.

The channel encoding block includes a modulator, an interleaver, and a channel encoder. The modulation block maps the signal output from the channel encoding block to carriers using Inverse FFT (IFFT). The RF processing block converts the baseband signal output from the modulation block to the RF signal and outputs the RF signal to the duplexer 1001.

Figure 11:
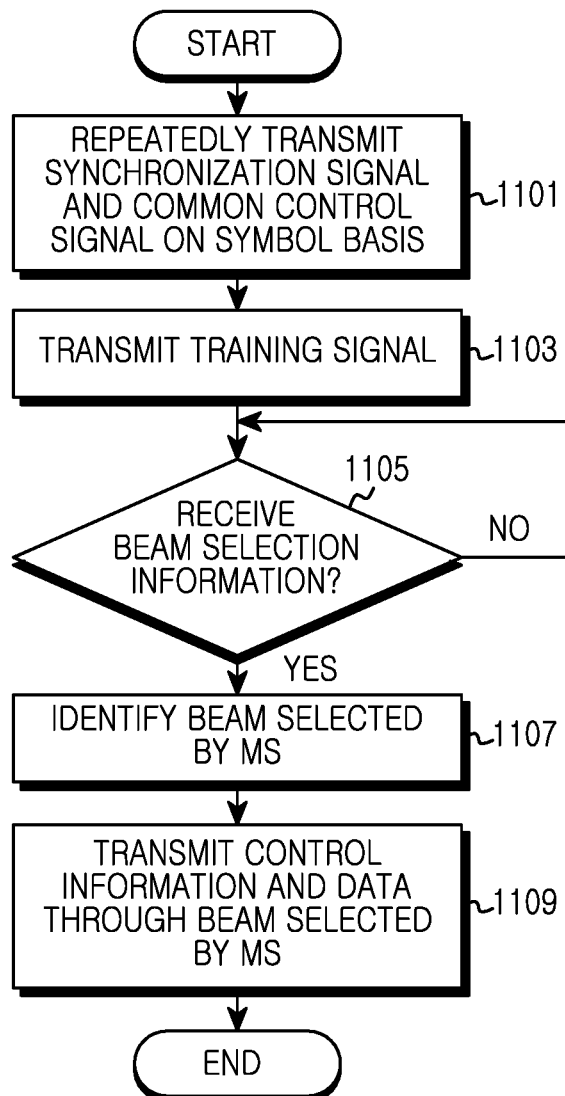
FIG. 11 is a flowchart illustrating a method for transmitting a signal using beamforming in a transmitting stage according to an exemplary embodiment of the present invention.

FIG. 11 is a flowchart illustrating a method for transmitting a signal using beamforming in a transmitting stage according to an exemplary embodiment of the present invention.

Referring to FIG. 11, the transmitting stage transmits the synchronization signal and the common control signal to the receiving stage over the synchronization signal and common control information slot in step 1101. For example, the transmitting stage transmits the synchronization signal and the common control information over the synchronization signal and common control information slot which is fixed in the frame. In so doing, the transmitting stage repeatedly transmits the synchronization signal and the common control information per antenna beam within the synchronization signal and common control information slot as shown in FIG. 2A, so that the synchronization signal and the common control information can be received at any location within the cell. Herein, either the synchronization signal or the common control information includes the beam identifier.

In step 1103, the transmitting stage sends the training signal over the training signal slot. For example, the transmitting stage sends the training signal by changing the beam direction in every direction for transmitting the data.

In step 1105, the transmitting stage determines whether beam selection information is received from the receiving stage. Herein, the beam selection information includes the information of the narrow beam selected by the receiving stage. For example, the transmitting stage determines whether the beam selection information is received over the uplink control slot.

Upon receiving the beam selection information, the transmitting stage identifies the narrow beam selected by the corresponding receiving stage in the beam selection information in step 1107.

In step 1109, the transmitting stage transmits the control information of the receiving stage and the data using the narrow beam selected by the receiving stage. For example, the transmitting stage transmits the control information of the receiving stage and the data over the control slot and the data slot of FIGS. 2B and 2C. In so doing, the transmitting stage adds the reference signal to the data based on the slot as shown in FIG. 3A, and adds the reference signal to the control information based on at least one symbol as shown in FIG. 3B. Herein, the control information includes the HARQ ACK/NACK information, power control information, paging information, resource allocation information, a signal transmission scheme, transmit beam information, and training signal slot information. Next, the transmitting stage completes this process.

In this exemplary embodiment, upon determining that the beam selection information is not received, the transmitting stage waits to receive the beam selection information. Alternatively, upon determining that the beam selection information is not received within a reference time, the transmitting stage may re-transmit the training signal.

Now, an exemplary method of the receiving stage for receiving the signal beamformed by the transmitting stage is explained.

Figure 12:
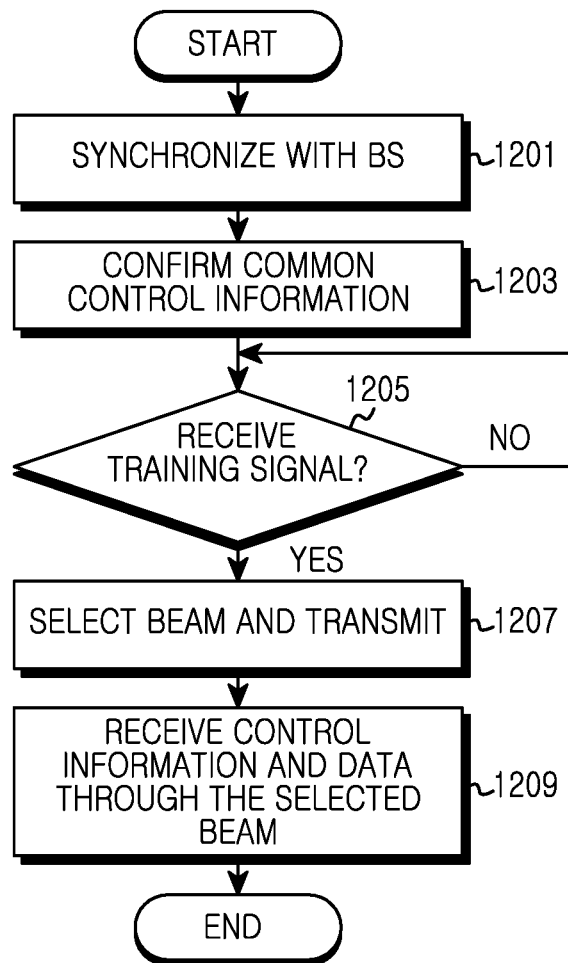
FIG. 12 is a flowchart illustrating a method for receiving a signal in a receiving stage according to an exemplary embodiment of the present invention.

FIG. 12 is a flowchart illustrating a method for receiving a signal in a receiving stage according to an exemplary embodiment of the present invention.

Referring to FIG. 12, the receiving stage acquires the synchronization with the transmitting stage in step 1201. For example, the receiving stage acquires the synchronization with the transmitting stage by detecting the transmit beam of the transmitting stage of the maximum receive power using the synchronization signals periodically received from the transmitting stage over the synchronization signal and common control information slot.

In step 1203, the receiving stage confirms the common control information received from the transmitting stage. For example, the receiving stage receives the common control information from the transmitting stage over the synchronization signal and common control information through the transmit beam of the transmitting stage detected in step 1201.

In step 1205, the receiving stage determines whether the training signal is received. For example, the receiving stage determines whether the training signal is received over the training signal slot.

Upon receiving the training signal, the receiving stage selects the narrow beam to be used to receive the data and transmits the data to the transmitting stage in step 1207. In so doing, the receiving stage selects the transmit beam of the transmitting stage for transmitting the control information and the data using the training signals, and the receive beam for receiving the control information and the data from the transmitting stage.

In step 1209, the receiving stage receives the control information and the data through the narrow beam. In so doing, the receiving stage receives the control information and the data over the control slot and the data slot of FIGS. 2B and 2C. For example, the receiving stage confirms the data slot and the resource allocation information in the control information received over the control slot. Next, the receiving stage receives the data using the data slot and the resource allocation information. At this time, the receiving stage can estimate the channel using the reference signal of the control information and the data. For example, the receiving stage estimates the channel using the slot-based reference signal of the data as shown in FIG. 3A. For example, the receiving stage may estimate the channel using the symbol-based reference signal of the control information as shown in FIG. 3B. That is, the receiving stage estimates the channel using the reference signal received through the beam selected in step 1207 among the reference signals transmitted by the transmitting stage by changing the beam per symbol in the control slot. Next, the receiving stage completes this process.

In this exemplary embodiment, the receiving stage receives the signal from the transmitting stage. When the receiving stage has control information and data to transmit to the transmitting stage, the receiving stage transmits to the transmitting stage the control information over the control slot of the uplink frame of FIG. 5 or 6, and the data over the data slot.

In this exemplary embodiment, the receiving stage transmits the selected narrow beam information to the transmitting stage using the training signal.

Figure 13:
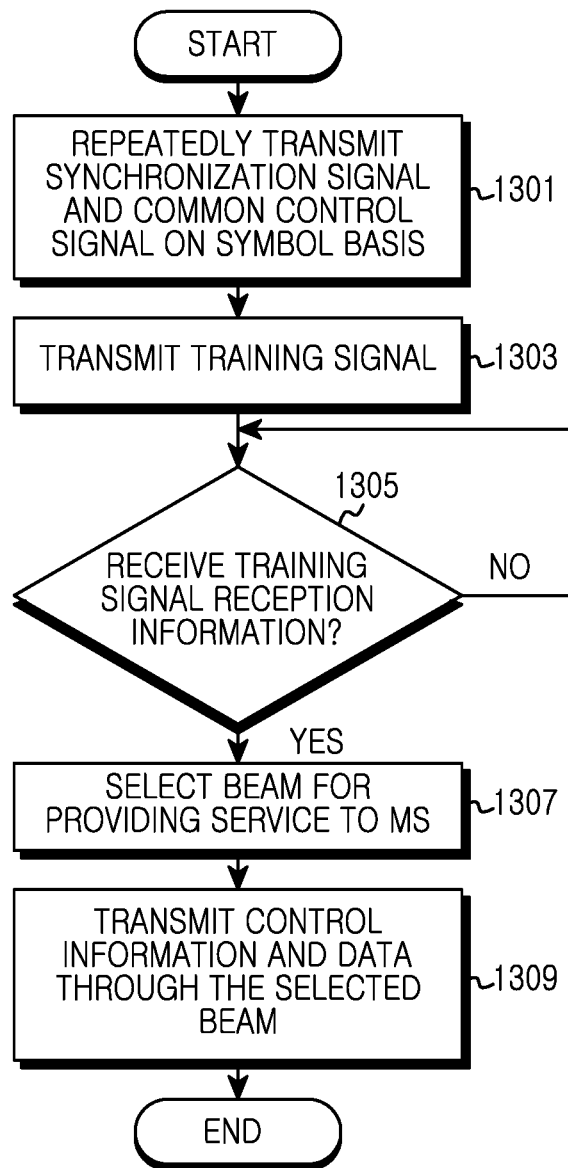
FIG. 13 is a flowchart illustrating a method for transmitting a signal using beamforming in a transmitting stage according to an exemplary embodiment of the present invention.

Alternatively, the transmitting stage may transmit the training signal using a vertical beam and a horizontal beam as shown in FIG. 13. In this case, the receiving stage can transmit its selected vertical beam and horizontal beam information to the transmitting stage so that the transmitting stage can select the narrow beam. Herein, the vertical beam indicates the narrow and vertically long beam, and the horizontal beam indicates the short and wide beam.

FIG. 13 is a flowchart illustrating a method for transmitting a signal using beamforming in a transmitting stage according to an exemplary embodiment of the present invention.

Referring to FIG. 13, the transmitting stage transmits the synchronization signal and the common control signal to the receiving stage over the synchronization signal and common control information slot in step 1301. For example, the transmitting stage transmits the synchronization signal and the common control information over the synchronization signal and common control information slot which is fixed in the frame. In so doing, the transmitting stage repeatedly transmits the synchronization signal and the common control information per antenna beam within the synchronization signal and common control information slot as shown in FIG. 2A, so that the synchronization signal and the common control information can be received at any location within the cell. Herein, either the synchronization signal or the common control information includes the beam identifier.

In step 1303, the transmitting stage sends the training signal over the training signal slot. For example, the transmitting stage sends the training signal by changing the beam direction in every direction for transmitting the data. The transmitting stage sends the training signal by altering the directions of the vertical beam and the horizontal beam.

In step 1305, the transmitting stage determines whether training signal reception information is received from the receiving stage. Herein, the training signal reception information includes information of the optimum vertical beam and the optimum horizontal beam selected by the corresponding receiving stage. The optimum vertical beam indicates the vertical beam of the maximum receive power among the vertical beams received at the receiving stage, and the optimum horizontal beam indicates the horizontal beam of the maximum receive power among the horizontal beams received at the receiving stage.

Upon receiving the training signal reception information, the transmitting stage selects the narrow beam to be used to transmit the control information and the data to the receiving stage, using the optimum vertical beam and horizontal beam which are selected by the receiving stage and contained in the training signal reception information in step 1307. For example, the transmitting stage selects the narrow beam overlapping between the optimum vertical beam and the optimum horizontal beam selected by the receiving stage, as the narrow beam to be used to transmit the control information and the data to the receiving stage.

In step 1309, the transmitting stage transmits the control information of the receiving stage and the data using the selected narrow beam. For example, the transmitting stage transmits the control information of the receiving stage and the data over the control slot and the data slot of FIGS. 2B and 2C. In so doing, the transmitting stage adds the reference signal to the data based on the slot as shown in FIG. 3A, and adds the reference signal to the control information based on at least one symbol as shown in FIG. 3B. Next, the transmitting stage completes this process.

In this exemplary embodiment, upon determining that the training signal reception information is not received, the transmitting stage waits to receive the training signal reception information. Alternatively, upon determining that the training signal reception information is not received within a reference time, the transmitting stage may re-transmit the training signal.

Figure 14:
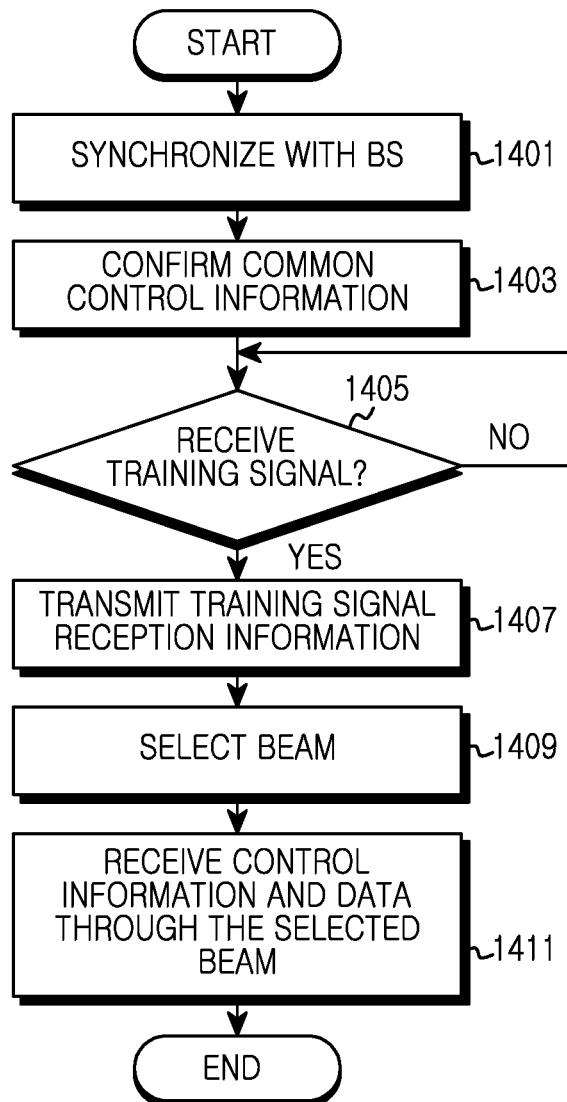
FIG. 14 is a flowchart illustrating a method for receiving a signal in a receiving stage according to an exemplary embodiment of the present invention.

FIG. 14 is a flowchart illustrating a method for receiving a signal in a receiving stage according to an exemplary embodiment of the present invention.

Referring to FIG. 14, the receiving stage acquires the synchronization with the transmitting stage in step 1401. For example, the receiving stage acquires the synchronization with the base station by detecting the transmit beam of the transmitting stage of the maximum receive power using the synchronization signals periodically received from the transmitting stage over the synchronization signal and common control information slot.

In step 1403, the receiving stage confirms the common control information received from the transmitting stage. For example, the receiving stage receives the common control information from the transmitting stage over the synchronization signal and common control information slot through the transmit beam of the transmitting stage detected in step 1401.

In step 1405, the receiving stage determines whether the training signal is received. For example, the receiving stage determines whether the training signal is received over the training signal slot.

Upon receiving the training signal, the receiving stage transmits the training signal reception information to the transmitting stage in step 1407. For example, the transmitting stage transmits the training signals sequentially using the vertical beam and the horizontal beam by changing the beam direction. In this case, the receiving stage transmits the signal to the transmitting stage by selecting the optimum vertical beam from the vertical beams and the optimum horizontal beam from the horizontal beams. Herein, the optimum vertical beam indicates the vertical beam of the maximum receive power among the vertical beams, and the optimum horizontal beam indicates the horizontal beam of the maximum receive power among the horizontal beams.

In step 1409, the receiving stage selects the narrow beam to be used to receive the control information and the data using the optimum vertical beam and the optimum horizontal beam. For example, the receiving stage selects the narrow beam overlapping between the optimum vertical beam and the optimum horizontal beam, as the narrow beam to be used to receive the data. In so doing, the receiving stage selects the transmit beam of the transmitting stage for transmitting the control information and the data using the training signals, and the receive beam for receiving the control information and the data from the transmitting stage.

In step 1411, the receiving stage receives the control information and the data through the narrow beam. In so doing, the receiving stage receives the control information and the data over the control slot and the data slot of FIGS. 2B and 2C. For example, the receiving stage confirms the data slot and the resource allocation information in the control information received over the control slot. Next, the receiving stage receives the data using the data slot and the resource allocation information. At this time, the receiving stage can estimate the channel using the reference signal of the control information and the data. For example, the receiving stage estimates the channel using the slot-based reference signal of the data as shown in FIG. 3A. For example, the receiving stage may estimate the channel using the symbol-based reference signal of the control information as shown in FIG. 3B. That is, the receiving stage estimates the channel using the reference signal received through the beam selected in step 1409 among the reference signals transmitted by the transmitting stage by changing the beam per symbol in the control slot. Next, the receiving stage completes this process.

In this exemplary embodiment, the receiving stage receives the signal from the transmitting stage. When the receiving stage has control information and data to transmit to the transmitting stage, it transmits to the transmitting stage the control information over the control slot of the uplink frame of FIG. 5 or 6, and the data over the data slot.

As set forth above, by virtue of the frame for the communication using beamforming in the wireless communication system, the communication can be fulfilled using beamforming.

In exemplary embodiments of the present invention, a frame is constructed in a wireless communication system to distinguish a slot for at least one of a synchronization signal and common control information, a training signal slot, a control slot, and a data slot. Thus, a reception performance of a mobile station can be enhanced, and a reception complexity and overhead can be reduced.

The wireless communication system transmits control information by puncturing part of the data slot. Hence, transmission efficiency of the control information can be increased, thereby reducing resource waste in transmitting control information.

Since the control slot is placed in front of a subframe in the wireless communication system, power consumption of a mobile station can be reduced by preventing unnecessary data reception.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a terminal, the method comprising:
   receiving, from a base station (BS), a downlink signal using a transmit beam of the BS, wherein the downlink signal includes a synchronization signal, a control signal fora master information block (MIB), and a reference signal; and
   identifying an identifier of the downlink signal based on the reference signal,
   wherein the reference signal is used to indicate the identifier of the downlink signal, and
   wherein the identifier of the downlink signal is associated with an order of the downlink signal among a plurality of downlink signals in a designated region of a frame.

2. The method of claim 1, wherein the control signal includes information on the identifier of the downlink signal.

3. The method of claim 1,
   wherein the plurality of downlink signals are transmitted on different directions, in the designated region of the frame, and
   wherein the identifier of the downlink signal corresponds to a beam identifier of the transmit beam of the BS.

4. The method of claim 1,
   wherein the synchronization signal and the control signal are mapped on consecutive symbols,
   wherein the MIB includes information on a frame number, and
   wherein a number of the plurality of downlink signals depends on a number of slots in the designated region of the frame.

5. The method of claim 1,
   wherein symbols of the reference signal are arranged at regular subcarrier intervals in a frequency domain and a location of the symbols is associated with a cell identifier, and
   wherein a sequence of the reference signal is associated with the cell identifier.

6. A method performed by a base station (BS), the method comprising:
   generating a reference signal based on an identifier of a downlink signal using a transmit beam of the BS; and
   transmitting, to a terminal, the downlink signal using the transmit beam of the BS, wherein the downlink signal includes a synchronization signal, a control signal for a master information block (MIB), and the reference signal,
   wherein the reference signal is used to indicate the identifier of the downlink signal, and
   wherein the identifier of the downlink signal is associated with an order of the downlink signal among a plurality of downlink signals in a designated region of a frame.

7. The method of claim 6, wherein the control signal includes information on the identifier of the downlink signal.

8. The method of claim 6,
   wherein the plurality of downlink signals are transmitted on different directions, and
   wherein the identifier of the downlink signal corresponds to a beam identifier of the transmit beam of the BS.

9. The method of claim 6,
   wherein the synchronization signal and the control signal are mapped on consecutive symbols,
   wherein the MIB includes information on a frame number, and
   wherein a number of the plurality of downlink signals depends on a number of slots in the designated region of the frame.

10. The method of claim 6,
    wherein symbols of the reference signal are arranged at regular subcarrier intervals in a frequency domain and a location of the symbols is associated with a cell identifier, and
    wherein a sequence of the reference signal is associated with the cell identifier.

11. A terminal, comprising:
    at least one transceiver; and
    at least one processor configured to:
    receive, from a base station (BS) via the at least one transceiver, a downlink signal using a transmit beam of the BS, wherein the downlink signal includes a synchronization signal, a control signal for a master information block (MIB) and a reference signal, and
    identify an identifier of the downlink signal based on the reference signal,
    wherein the reference signal is used to indicate the identifier of the downlink signal, and
    wherein the identifier of the downlink signal is associated with an order of the downlink signal among a plurality of downlink signals in a designated region of a frame.

12. The terminal of claim 11, wherein the control signal includes information on the identifier of the downlink signal.

13. The terminal of claim 11,
wherein the plurality of downlink signals are transmitted on different directions, and
wherein the identifier of the downlink signal corresponds to a beam identifier of the transmit beam of the BS.

14. The terminal of claim 11,
wherein the synchronization signal and the control signal are mapped on consecutive symbols,
wherein the MIB includes information on a frame number, and
wherein a number of the plurality of downlink signals depends on a number of slots in the designated region of the frame.

15. The terminal of claim 11,
wherein symbols of the reference signal are arranged at regular subcarrier intervals in a frequency domain and a location of the symbols is associated with a cell identifier, and
wherein a sequence of the reference signal is associated with the cell identifier.

16. A base station (BS), comprising:
at least one transceiver; and
at least one processor configured to:
  generate a reference signal based on an identifier of a downlink signal using a transmit beam of the BS; and
  transmit, via the at least one transceiver to a terminal, the downlink signal using the transmit beam of the BS,
wherein the downlink signal includes a synchronization signal, a control signal for a master information block (MIB), and the reference signal,
wherein the reference signal is used to indicate the identifier of the downlink signal, and
wherein the identifier of the downlink signal is associated with an order of the downlink signal among a plurality of downlink signals in a designated region of a frame.

17. The base station of claim 16, wherein the control signal includes information on the identifier of the downlink signal.

18. The base station of claim 16,
wherein the plurality of downlink signals are transmitted on different directions, and
wherein the identifier of the downlink signal corresponds to a beam identifier of the transmit beam of the BS.

19. The base station of claim 16,
wherein the synchronization signal and the control signal are mapped on consecutive symbols,
wherein the MIB includes information on a frame number, and
wherein a number of the plurality of downlink signals depends on a number of slots in the designated region of the frame.

20. The base station of claim 16,
wherein symbols of the reference signal are arranged at regular subcarrier intervals in a frequency domain and a location of the symbols is associated with a cell identifier, and
wherein a sequence of the reference signal is associated with the cell identifier.

* * * * *